United States Patent [19]

Hafer

[11] 4,087,632

[45] May 2, 1978

[54] SPEECH RECOGNITION SYSTEM

[75] Inventor: Edward Henry Hafer, Lisle, Ill.

[73] Assignee: Bell Telephone Laboratories, Incorporated, Murray Hill, N.J.

[21] Appl. No.: 745,066

[22] Filed: Nov. 26, 1976

[51] Int. Cl.² .............................................. G10L 1/00
[52] U.S. Cl. ................................................ 179/1 SD
[58] Field of Search ........................... 179/1 SD, 1 SA

[56] References Cited

U.S. PATENT DOCUMENTS

| 3,129,287 | 4/1964 | Bakis | 179/1 SD |
|---|---|---|---|
| 3,395,249 | 7/1968 | Clapper | 179/1 SD |
| 3,530,248 | 9/1970 | Coker | 179/1 SG |
| 3,624,302 | 11/1971 | Atal | 179/1 SA |
| 3,679,830 | 7/1972 | Uffelman et al. | 179/1 SD |
| 3,723,667 | 3/1973 | Park et al. | 179/1 SC |
| 3,755,627 | 8/1973 | Berkowitz | 179/1 SD |

OTHER PUBLICATIONS

T. Martin, "Acoustic Recognition of a Limited Vocabulary", Ph.D. Dissertation, University Microfilms, Ann Arbor, Mich., 1970.
R. Houde, "A Study of Tongue Body Motion etc.", Ph.D. Dissertation, University Microfilms, Ann Arbor, Mich., 1967.

Primary Examiner—Thomas W. Brown
Assistant Examiner—E. S. Kemeny
Attorney, Agent, or Firm—Henry T. Brendzel

[57] ABSTRACT

A speech recognition system is realized by applying a speech signal to a feature extractor wherein a sequence of predetermined features representing the speech signal are determined, and by comparing the determined features, in an acceptor, to predetermined sequences of features which represent selected words. One attribute of the feature extractor is the ability to represent certain classes of sounds in terms of the position and direction of motion of the movable structures of a human vocal tract model, such as the position and direction of movement of the speaker's tongue body. The tongue body position is derived by determining the formant frequencies in the applied speech signal and by employing the Coker vocal tract model to find the tongue body position which best matches the determined formants.

11 Claims, 7 Drawing Figures

SPEECH RECOGNITION SYSTEM

BACKGROUND OF THE INVENTION

1. Field of the Invention

This relates to speech analysis systems and, more particularly, to systems for analyzing connected speech and for automatically recognizing its context.

2. Description of the Prior Art

Automatic speech recognition has long been a goal of speech researchers although, until the computer-age explosion, very little was done in the area. In the past few years considerable effort has been expended in this field, resulting in the realization of various systems which permit one, for the first time, to "talk" directly to a computer.

One major obstacle to progress in the field of automatic speech rcognition has been the great variation in speech characteristics between individuals; particularly between men, women, and children. To circumvent this obstacle, some researchers have chosen to develop systems tailored or adapted to a particular speaker, while others have chosen to develop "universal speaker" systems that are capable of responding to any speaker, but recognize, only a limited vocabulary.

One system in the latter class has been described by T. R. Martin in "Acoustic Recognition of a Limited Vocabulary in Continuous Speech," *University of Pennsylvania, Ph. D. Thesis,* 1970. Martin describes a system which recognizes a limited vocabulary by abstracting particular features from the speech signal and by matching the derived sequence of features to a preselected set of feature sequences that represent the vocabulary sought to be recognized. The features selected by Martin for abstracting are characteristic of the elemental sounds in speech. He distinguishes three characterization levels of such features. The first level represents the broad class features, the second level subdivides the class features into less broad categories, and the third level — which Martin does not employ in his speech recognition apparatus — comprises the actual phonemes of the speech.

To abstract the features employed, Martin computes the area of spectrum rise and fall in the speech and the formants contained therein. To do so, he divides the speech spectrum into a plurality of contiguous bands and detects the energy contained in each band. The presence of various features is determined by logic circuitry which is made appropriately responsive to output signals of the various bands.

In the area of physiological study of speech, R. Houde has investigated tongue body motions during speech. In "A Study of Tongue Body Motion During Selected Speech Sounds," *University of Michigan, Ph. D. Thesis,* 1967, Houde reported that the tongue body trajectories of different speakers pronoucing the same utterance, e.g., / igugi / , are quite similar; in particular, with respect to the target position of the tongue movement.

Also in the area of physiological study of speech, C. H. Coker has developed a physical model of the vocal tract which is capable of being controllably altered to produce various signal formant sets characteristic of human speech. In particular, for each vocal tract length and tongue body position. Coker's model generates a set of formants which characterizes the sound that would be generated by a human speaker. This model has successfully been employed by Coker to synthesize speech, as is described in "A Model of Articulatory Dynamics and Control," *Processing of the IEEE,* Vol. 64, No. 4, 1976. This model is also described in U.S. Pat. No. 3,530,248 issued to C. Coker on Sept. 22, 1970.

SUMMARY OF THE INVENTION

This invention recognizes connected speech by deriving from the signal of a spoken utterance a number of features, including a tongue body trajectory feature, and by deciphering therefrom the words that were uttered. In accordance with the principles of the invention, the speech signal is analyzed to develop a number of features similar to those of Martin, plus a feature (unlike any of Martin's features) which characterizes the speaker's tongue body position and movement. The derivation of the tongue body position is achieved by determinng the formant frequencies of the speech and by employing a human vocal tract model, such as the Coker vocal tract model, to find the tongue body position which best matches the computed formants. In the best mode embodiment described herein, Coker's model was used in reverse by precomputing the best fitting vocal tract shape for each set of three lowest formant frequencies and by obtaining therefrom the tongue body position of each such set. The length of the vocal tract is allowed to vary in this application of Coker's model so that the vocal tract length variations of different speakers, e.g., men, women, and children, are appropriately compensated. Once the speech features are obtained, the succession of features is compared to the feature sequences of selected words and, from the comparision, the spoken words are recognized.

DETAILED DESCRIPTION

Figure 1:
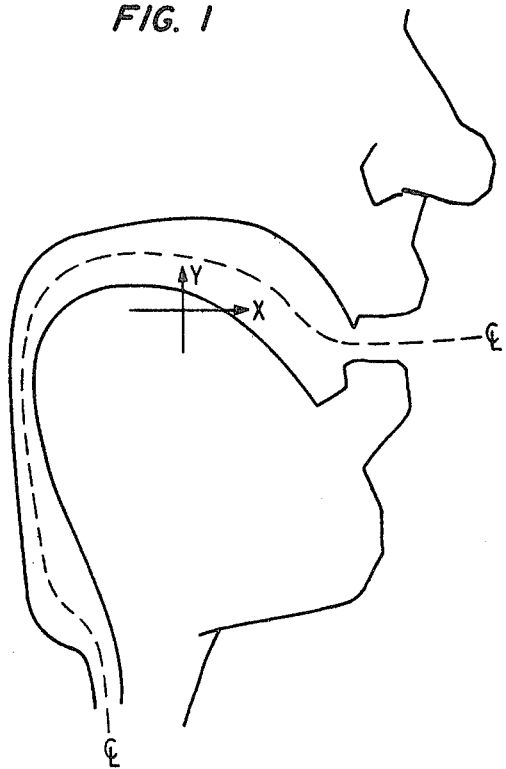
FIG. 1 depicts a cross-sectional view of the mouth cavity, with an x-y coordinate system drawn therein.

FIG. 1 depicts a cross-sectional view of a mouth cavity with an x-y axis superimposed therein. The x-y axes of subsequent figures relate the x-y axis of FIG. 1.

Figure 2:
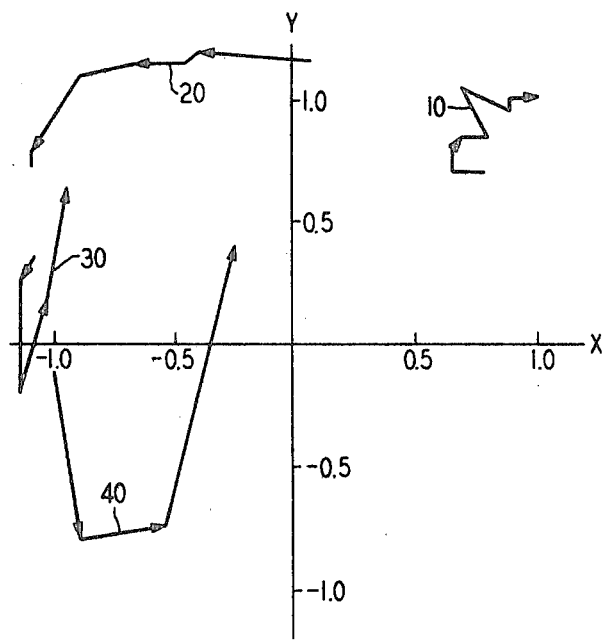
FIG. 2 illustrates the tongue body trajectory of digits "eight", "two", "one", and "five", in accordance with the coordinate system of FIG. 1.

A study of tongue body movements reveals that regardless of whether the speaker is a male, a female, or a child, the tonue body traverses reasonably the same trajectory when a particular digit between 0 and 9 is pronounced. FIG. 2 depicts such tongue body trajectories, wherefrom the following can be gleaned. The digit "eight", curve 10, is charcterized by a tongue body moving in a generally forward and upward direction starting in the center of the upper forward quadrant of the mouth cavity. The digit "two", curve 20, is characterized by the tongue body starting high in the center of the cavity, moving horizontally backward, and falling downward in the back of the mouth. The digit "one", curve 30, is characterized by the tongue body moving essentially downward in the back of the mouth and then reversing direction and moving upwards. Finally, the digit "five", curve 40, is characterized by the tongue body moving downward into the back lower quadrant of the mouth cavity and therein moving forward and upward toward the center of the mouth.

From the above trajectory descriptions it can be appreciated that the unique tongue body trajectories of various spoken digits, when added to other indicia of speech, can greatly enhance recognition of spoken digits. Therefore, in accordance with the speech recognition approach of this invention, the tongue body trajectory of a speaker is employed as a feature of the speech recognition system, together with a silence feature, a burst or a stop consonant feature, and a noise and noise-like fricative feature (one for voiced and one for unvoiced fricatives).

Figure 3:
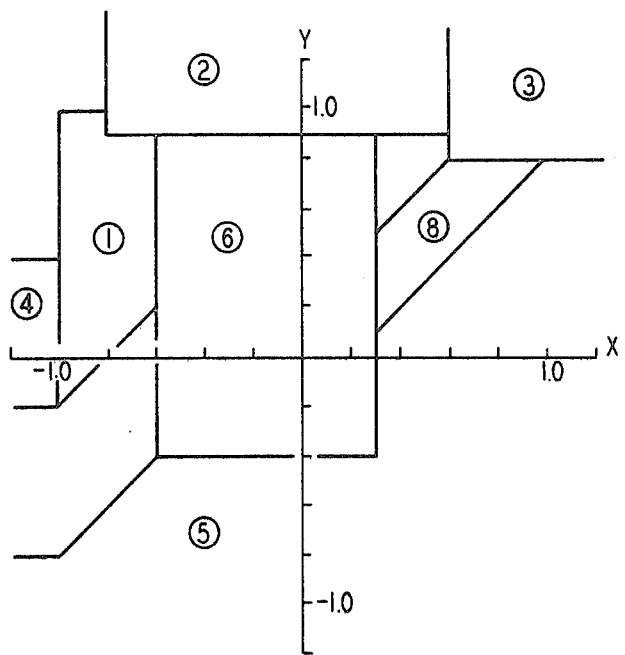
FIG. 3 depicts a subdivided x-y coordinate system used to map tongue body positions into regions characteristic of vowel like sounds.

As for the tongue body trajectory feature, it has been found that in a system for recognizing digits the exact tongue body position and trajectory are not needed for proper characterization of the tongue body trajectory feature, or token. A token, in the context of this invention is the signal representing the feature. Rather, only the general region where the tongue body is situated and its general direction of movement need to be known. Accordingly, the tongue body trajectory token in the illustrative embodiment described herein only distinguishes certain regions of the mouth cavity. FIG. 3 depicts the various regions which were found to be useful in a system for detecting spoken digits, with each region indicating the likelihood that the vowels of a certain digit have been uttered. For example, a tongue body located in the region marked with an encircled 8 indicates that the initial vowel sound in the digit "eight" has, most likely, been spoken.

To develop the tongue body trajectory token, the position and direction of movement of the tongue body need to be ascertained. The direction of movement is obtained by comparing successive tongue body positions. The tongue body positions are obtained by extracting the formant frequencies of the analyzed speech and by transforming computed formant frequencies to tongue body positions with the aid of Coker's voice tract model. Since for each tongue body position Coker's model provides a set of expected formant frequencies, by applying the model in reverse, the tongue body position can be ascertained from each set of computed formants. The employment of Coker's model is more fully discussed infra in connection with the description of the apparatus used in the practice of this invention.

The Apparatus

Figure 4:
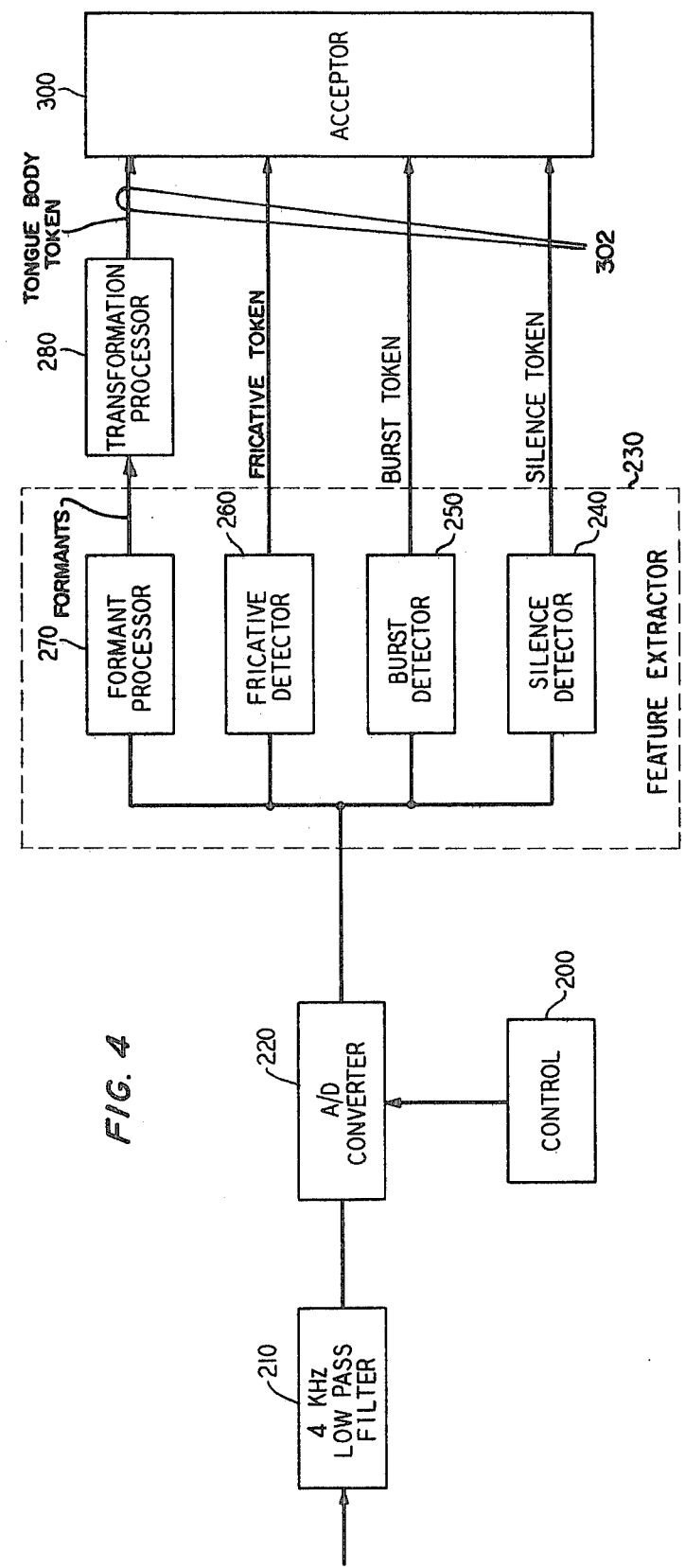
FIG. 4 is a block diagram of one embodiment of this invention.

A block diagram of apparatus for recognizing spoken digits in accordance with the principles of this invention is illustrated in FIG. 4. Therein, an incoming speech signal to be analyzed and recognized is applied to filter 210, which is a low-pass filter of standard design having a passband of 4 kHz. Responsive to filter 210 is sampler and A/D converter 220 which samples the applied signal, converts it to a digital format and submits the converted signal in time segments called frames to further processing. Converter 220 is controlled by element 200, the control element, which provides converter 220 with an appropriate sampling clock (e.g., 10 kHz) and with whatever other signals required by the particular A/D converter chosen. Any of a number of commercially available A/D converters can conveniently be used in block 210, e.g., Teledyne Philbrick, Incorporated, Model 4130.

Responsive to converter 220 is feature extractor 230 which includes a silence detector 240, a burst detector 250, a fricative detector 260 and a formant processor 270. The extended feature extractor contains feature extractor 230 and a transformation processor 280.

Silence detector 240, as the name implies, detects the presence of silence in the tested frame. Silence detector 240 may be implemented by rectifying and integrating the tested signal, much like a conventional receiver rectifies and integrates received signals, and by comparing the integrated signal to a fixed threshold. Alternatively a speech detector may be employed to determine the absence of speech, such as element 24 in U.S. No. 3,723,667 issued to Park et al. on Mar. 27. 1973. In accordance with this invention, when a silence is detected a Silence token is generated and applied to acceptor 300. It is a "yes" or "no" decision. The Silence token is a signal having a predetermined format which may, for example, be a 3-bit binary word having the value $1_2(001)$.

A burst, which occurs between some phoneme to phoneme transitions, is characterized by a relatively abrupt increase in energy throughout the speech spectrum. Therefore, to detect a burst, the measure of energy rate of increase throughout the band is necessary. This is achieved in burst detector 250 by dividing the 4 kHz band into a plurality of contiguous sub-bands and by properly measuring the energy in the sub-bands. The energy is measured by rectifying and integrating the energy in each sub-band, by limiting the energy in each sub-band to a prechosen level and by summing and differentiating the limited energy outputs of the sub-bands. Because of the limiting process, a large increase in the energy of one sub-band cannot produce a large differentiated sum signal while an abrupt moderate increase throughout the 4 kHz band can develop a large differentiated sum signal. Thus, the differentiated sum signal can conveniently serve to indicate the rate of energy increase in the overall 4 kHz band.

Implementation of burst detector 250 is quite conventional since the processing operations therein are well known and straightforward. For example, detector 250 may contain a set of contiguous bandpass filters responsive to the speech signal, a rectifier, an integrator coupled to a threshold limiter connected to the output port of each of the bandpass filters, and an adder followed by a differentiator responsive to each of the threshold limiters. Applying the output signal of the differentiator to another threshold circuit results in a binary output which represents the presence or absence of a burst. Of course, when a burst is present, a Burst token is generated.

As with the Silence token, the Burst token is applied to acceptor 300. The Burst token may have the same format as the Silence token, i.e., a 3-bit binary word, while carrying a value different from that of the Silence token, e.g., $2_2(010)$. Various designs of circuits useful in implementing detector 250 may be found in Millman and Taub, *Pulse Digital and Switching Waveforms*, McGraw-Hill 1965.

Fricative detector 260 generates a token whenever the analyzed frame contains a voiced noise-like consonant, e.g., / z, v / or an unvoiced noise-like consonant, e.g., / s, f, θ, t, k /. Unvoiced noise-like consonants are characterized by a high frequency concentration of noise-like energy, whereas voiced noise-like consonants are characterized by a strong energy component at low frequencies, e.g., about 500 kHz. T. R. Martin, in the aforementioned doctoral dissertation, discloses hardware for recognizing the presence of voiced and unvoiced noise-like consonants. This hardware may conveniently be used in the implementation of this invention. If so used, it must be modified, using conventional techniques, to provide an output signal having a multi-bit binary format much like the format of the Burst token. For example, the fricative token applied to acceptor 300 may have the values $3_2$ (011) and $4_2$ (100) when specifying a voiced fricative and an unvoiced fricative, respectively. As suggested herein, the Silence, Burst, and Fricative tokens each have a 3-bit format but the values are different. The 3-bit buses out of elements 240, 250, and 260 can therefore be combined into a single 3-bit bus. of course, other signal formants are also possible.

Formant processor 270 analyzes the frame signals and extracts therefrom formant frequencies. Formant frequencies are pronounced single frequency components in the speech spectrum which are present most distinctly when vowel sounds are pronounced. Although formant extraction is not an easy task, it is quite basic to the art of speech analysis and synthesis and is, therefore, well covered in the literature. Useful techniques and apparatus for implementing formant processor 270 are described, inter alia, in the following:

1. B. S. Atal and S. L. Hanauer, "Speech Analysis and Synthesis by Linear Prediction of the Speech Wave," *JASA*, Volume 50, pp 637–655, 1971;

2. U.S. Pat. No. 3,624,302 issued to B. S. Atal on Nov. 30, 1971:

3. S. S. McCandless, "An algorithm for Automatic Formant Extraction Using Linear Prediction Spectra," *IEEE Transactions on Acoustics Speech and Signal Processing*, Volume ASSP 22 No. 2, pp 135–141, April 1974.

4. J. D. Markel, "Digital Inverse Filtering—A New Tool for Formant Trajectory Estimation," *IEEE Transactions Audio Electric Acoustics*, Volume Au-2, pp. 129–137, 1971;

5. B. Gold and L. R. Rabiner, "Parallel Processing Techniques for Estimating Pitch Periods of Speech in the Time Domain," *JASA*, Volume 46, 1969;

6. U.S. Pat. No. 3,649,765 issued to R. W. Shafer et al on Mar. 14, 1972; and

7. L. R. Rabiner et al, "A Hardware Realization of a Digital Formant Synthesizer, *IEEE Trans. Comm. Tech.*, Volume COM-19, pp. 1016–1020, November 1971.

Once the formant frequencies are obtained, e.g., by employing the hardware described by Rabiner et al in the above referenced article numbered 7, transformation processor 280 converts the obtained formant frequencies to tongue body positions, and from successive tongue body positions processor 280 develops the Tongue body trajectory tokens. Formant processor 270 delivers a signal to transformation processor 280 that is representative of the three lowest frequency formants found in the speech signal. Those three formants are preferably presented simultaneously, in parallel, comprising a single juxtaposed field. Thus, when each formant is defined by an 8-bit code or field, the juxtaposed output field of processor 270 is a 24-bit field. The output signal of processor 280 is a binary parallel field which represents the Tongue body position token; and more particularly, the moutn cavity region as defined in FIG. 3 and the direction of movement of the tongue body.

As indicated previously, the development of the tongue body position and trajectory is in accordance with Coker's vocal tract model. More particularly, Coker develops the formants resulting from each tongue body position. Here, Coker's model us used in reverse, to develop a tongue body position from a set of three lowest formant frequencies.

A simplified description of Coker's model and of the model's use to develop a tongue body position corresponding to a set of presented formants is found in "speech Analysis by Articulatory Synthesis," E. H. Hafer Masters Dissertation, *Northwestern University Computer Sciences Department*, Evanston, Ill., June 1974. Pages 10–18 of the above dissertation and appendices 1–4 are particularly illuminating; the text explains the model and the method of deriving the appropriate formants from the model, and appendices 2–4 present the FORTRAN programs that may be employed in conjunction with a general purpose computer to develop the desired information. Since processor 280 may comprise a general purpose computer employing the programs disclosed in the above appendices, the above Hafer dissertation is hereby incorporated by reference and made a part of this disclosure. Also, since the incorporated programs are useful in specifying the manufacture of ROM look-up tables described below, the programs are supplied in an appendix to this disclosure for the convenience of those who shall practice this invention.

Briefly summarizing the model and its use, the vocal tract model is a parametric representation of a mid-sagittal plane of the human articulatory apparatus. Six parameters are used in the model to control the positioning of three articulators (tongue body, tongue tip, and lips). These articulators determine the cross-sectional area along the tract. The vocal tract area function is approximated by 36 uniformly spaced cross sections which are defined in planes perpendicular to the center line of the mouth cavity. As can be realized from a study of FIG. 1, the cross-sectional area of the mouth cavity varies with the position of the tongue body. Therefore, by determining the cavity's cross-sectional area from formant frequencies, the tongue body position can be determined.

In situations where a general purpose computer is the preferred embodiment for processor 280, the aforeincorporated programs may be employed to determine the tongue body position of a speaker. The programs operate in an interactive manner. First, the tongue body is assumed to be at a preselected state, and a set of formants characteristic of that state is derived. The state assumed is the last known position of the tongue body. From the assumed state of the tongue body the derived set of formants is compared to the applied formants (developed in processor 270), and an error function is evaluated to determine the difference between the derived formants and the speaker's formants. That error function dictates the changes that need to be made in the state of the vocal tract model in order to reduce the value of the error function. The model is changed, the formants are computed and the error function is again evaluated. Once the error is determined to be sufficiently small, the shape of the vocal tract model is analyzed to give what has been shown to be a reasonable approximation of the tongue body position for most vowels.

In situations where a general purpose computer may not be the preferred approach to implementing transformation processor 280, a different implementation may be had for purposes of this invention by precomputing, per the incorporated programs, the formant sets developed by Coker's model for all tongue body positions and vocal tract lengths of interest and by storing the evaluated formants in a look-up table. A read-only energy may be employed as the look-up table, and arranged to have the address field indicate the tongue body position and tract length employed by the model and the content of each memory location indicate the formants generated by the model in response to a model's state as characterized by the address field. Use of such a look-up table is iterative because the formants associated with selected tongue body positions and tract lengths would have to be compared to the formants derived by processor 270.

Preferably, an ROM look-up table is constructed with the formants comprising the independent variable rather than the dependent variable. That is, the three formants derived by the model are juxtaposed to form a single field and that field serves as an address field to a memory in which the locations contain the tongue body positions and tract lengths which correspond to the formants comprising the associated addresses. With such a look-up table, iterative operation is not necessary.

The output signal of transformation processor 280 is a Tongue body trajectory token which includes the tongue body position and a measure of the tongue's movement. The position information is obtained, as described, from the look-up table. The movement indication is derived by comparing the obtained position to the previous position. This can be done by storing the previous $x$ and $y$ coordinate positions and by subtracting same from the newly determined $x$ and $y$ coordinate positions. Since only 10 regions need to be discriminated to obtain a sufficient position indication (per FIG. 3), the format of the Tongue body token may be an 8-bit binary word, with the first four bits indicating tongue position, the next two bits indicating movement in the $x$ direction, and the last two bits indicating movement in the $y$ direction.

Summarizing the preferred embodiment of processor 280 as described herein, Coker's model, in reverse, is employed to develop a table of tongue body positions which best correspond to each set of three lowest formants. The table is most easily developed by using the program supplied herein since the principles of Coker's model are imbedded in that program. However, the use of this program is not mandatory; and also, instead of a memory look-up table, means can be provided to evaluate Coker's model in reverse. In the embodiment described herein, a table is used because it is the simplest implementation, and that table is permanently stored in an ROM. The ROM is addressed by the single field which is composed of the three juxtaposed fields defining the three lowest frequency formants. The output signal of processor 280 is an 8-bit field, with the first four bits indicating tongue position, the next two bits indicating horizontal tongue body movement and the last two bits indicating vertical tongue body movement.

The output signal of processor 280, like the output signals of elements 240, 250, and 260 is applied to acceptor 300.

If it were certain that signals corresponding only to valid digits would be applied to the word recognition system of this invention, then acceptor 300 would not have to be a very complex machine. Acceptor 300 would have an initial state from which it would branch to one of the sequences of tokens representing the digit being spoken and when the detection of the digit is completed, i.e., the full sequence of tokens is detected, acceptor 300 would re-enter the initial state, ready to decode the next digit. Unfortunately, acceptor 300 must be able to accept words, utterances, and sounds other than valid digits without being disabled or "stuck". Accordingly, acceptor 300 must be able to assume that any token is the start of a valid digit sequence and must be able to backtrack to a new sequence start whenever it gets "stuck". The requirement for backtracking may be better understood from the following example where the token sequences 6, 3, 5, 7, 6 and 3, 5, 7, 9 are valid sequences and where the token sequence 6, 3, 5, 7, 9 is encountered. When acceptor 300 proceeds through tokens 6, 3, 5, and 7 in the encountered sequence, it assumes that the sequence 6, 3, 5, 7, 6 is being detected and it therefore follows in that path. When the token 9 is reached, acceptor 300 must be able to determine that the sequence 6, 3, 5, 7, 9 is not a valid sequence and that it must, therefore, backtrack to a new sequence start. By so backtracking from token 9 to token 3, (deleting the first token-6) the sequence 3, 5, 7, 9 is properly detected by acceptor 300 as being a valid sequence.

Figure 7:
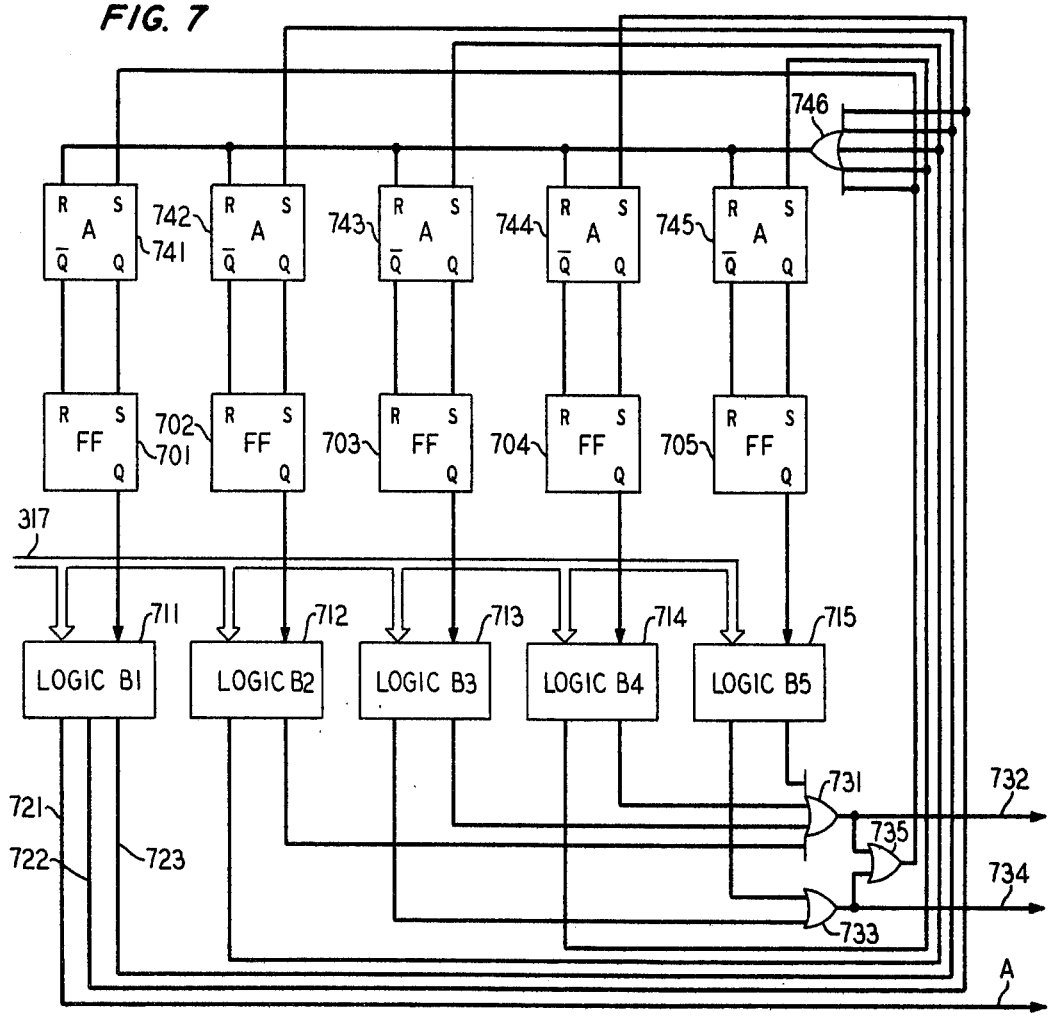
FIG. 7 depicts a block diagram of apparatus for implementing the state diagram of FIG. 5.

To perform the operations required, acceptor 300 is constructed as a finite state sequential machine which starts at an initial state and proceeds through various state transitions to one of 10 successful conclusions (detecting each of the 10 digits). Such sequential machines, which are sometimes called sequence detectors, are quite common. Design of such machines, to realize prescribed state diagrams, is described, for example, in *Switching Theory* by P. E. Wood, Jr., McGraw-Hill Book Co., 1968, Chapter 5; and in the speech area, such a sequential machine is described by Martin in his aforementioned doctoral dissertation and also described, among others, in U.S. Pat. No. 3,700,815, issued to Rowland et al on Oct. 24, 1972. Any deviation from an acceptable path leads back to the initial state. This is illustrated, for purposes of this disclosure, by the state diagram of FIG. 5 which describes the state transitions necessary for detecting the utterance "two eight." The complete state diagram of acceptor 300 depends, of course, on the exact list of words sought to be detected (digits 0–9, connecting words such as "hundred", etc.). The state diagram of FIG. 5 and the hardware for implementing it, shown in FIG. 7, are considered representative.

Figure 5:
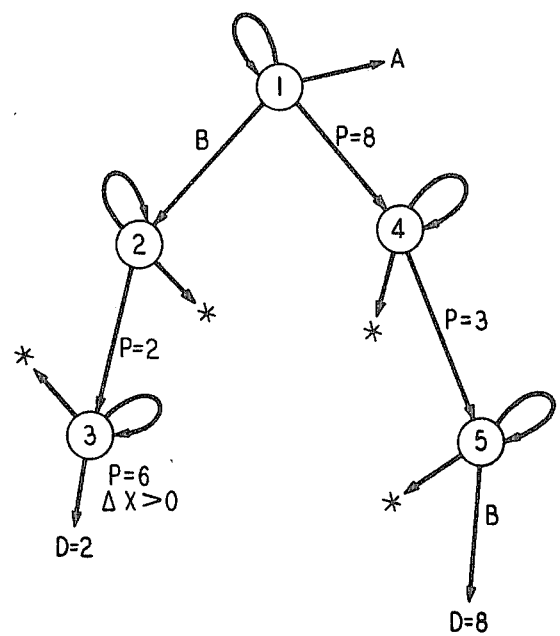
FIG. 5 shows the state diagram of acceptor 300 of FIG. 4 pertinent to the utterance "two eight"

State 1 of acceptor 300, which is depicted in FIG. 5 as a numeral 1 within a circle, is the initial state of acceptor 300. It is the state into which acceptor 300 enters whenever a test is completed successfully or unsuccessfully. Acceptor 300 remains in state 1 until a token is received which corresponds to the beginning of any of the recognizable words, e.g., digits. The ray designated A in FIG. 5 represents the exit paths from state 1 in the direction of digits other than "two" and "eight".

When the digit "two" is uttered, the /t/ sound of "two" results in a Burst token causing acceptor 300 to advance to state 2. This is indicated in FIG. 5 by the ray marked B (for Burst) extending from state 1 to state 2. Acceptor 300 stays in state 2 as long as a Burst token is applied but exits state 2 through the ray marked * whenever a token is applied which is not consonant with the continuation of the utterance "two". An exit marked by * designates a return to state 1 in a backtracking mode of operation. When the digit "two" is, in fact, uttered, a vowel segment follows the burst of /t/. The initial portion of the vowel segment yields a tongue body positioned in the second partition of FIG. 3. Therefore, in response to a token indicating a partition 2 tongue body position ($p=2$), acceptor 300 advances to state 3 as depicted in FIG. 5. Acceptor 300 remains in state 3 until the body enters partition 6 and begins to move in the positive $x$ direction. When this happens, the digit 2 is recognized, as indicated in FIG. 5 by the ray marked $D=2$, and the acceptor resets to state 1 in preparation for the next digit.

As indicated above, the second portion of the utterance "two" contains a vowel segment which produces a tongue body located in partition 6 and traveling in the positive $x$ direction. Since there is no digit whose beginning segment places the tongue body in partition 6, acceptor 300 remains in its initial state during the end-portion of the "two" utterance, until the beginning of the "eight" utterance.

The utterance "eight" begins with a vowel segment in partition 8. Hence, when the tongue body moves into partition 8, acceptor 300 exits state 1 and enters state 4. Continuing in the positive $x$ and $y$ directions, the tongue body moves upward into partition 3, at which time acceptor 300 advances to state 5 where it remains until the final Burst token of the utterance "eight" arrives, at which time, the digit "eight" is recognized and the acceptor resets to state 1, ready for the next digit.

In implementing acceptor 300, two major elements need to be considered: means for providing the backtracking capability and means for implementing the acceptor's state diagram.

For the backtracking capability, a memory is required to store the token sequences applied to acceptor 300. This memory must be arranged so that old data can be retrieved and reprocessed while new data is inserted. Such an arrangement is realized by storing the applied tokens in a conventional memory under control of a token address counter that is operating in modulo arithmetic equal to, or smaller than, the size of the memory (for example, with a 10 digit address counter, at least a 1024 word memory is employed). With such an arrangement, applied tokens are inserted sequentially into the memory as dictated by the token address counter and when, for example, location 1023 of the memory is filled (if a 10-bit counter is used), the next memory location to be filled (erasing the old information therein) is memory location 0.

Two more counters, operating in the same modulo as the token address counter, are included for proper utilization of the memory: a sequence start counter (counter A) and a current address counter (counter B). Counter A indicates the location of the first token in the tested sequence and counter B indicates the current address of the token in the sequence that is being tested. A block diagram of this arrangement is illustrated in FIG. 6.

Figure 6:
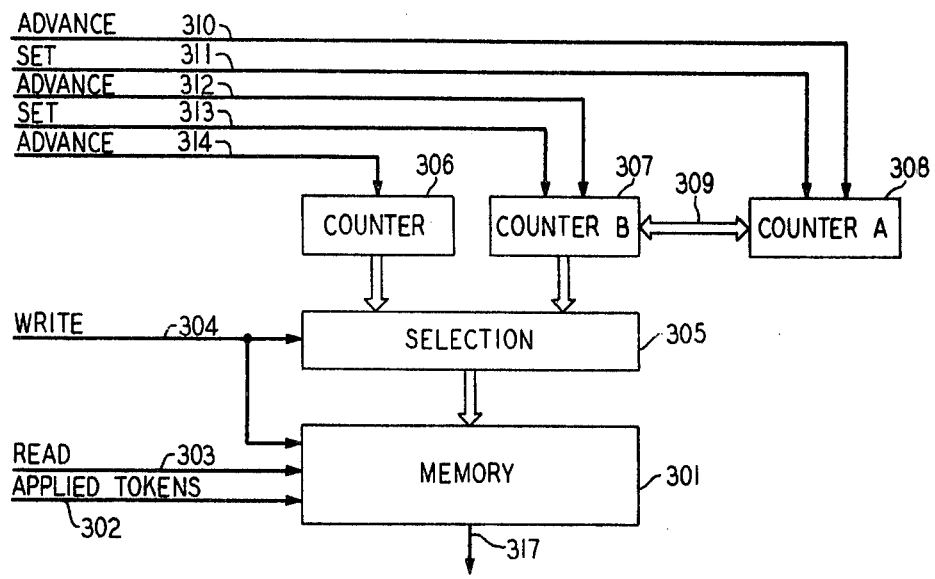
FIG. 6 illustrates the block diagram of the memory required in acceptor 300.

In FIG. 6, memory 301 stores the tokens applied to acceptor 300 on lead 302 and delivers the prestored tokens required by acceptor 300 on lead 317. The writing and reading of memory 301 is made in response to read and write control commands provided by control element 200 (FIG. 1) on leads 303 and 304. The proper address is provided to memory 301 by selection block 305 which, in turn, is responsive to counter 306 (token address counter) and to counter 307 (counter B). Counter 308 (counter A) interacts with counter 307 via bus line 309 and this interaction is maintained under control leads 310, 311, 312, and 313. A signal on control lead 310 advances counter 308 by one, the signal on control lead 311 duplicates the value of counter 307 in counter 308, a signal on control lead 312 advances counter 307 by one, and a signal on control lead 313 duplicates the value of counter 308 in counter 307. Lead 314 controls counter 306, advancing it every time a new token is applied.

In operation, when a sequence test is started, both counter A and counter B address the same location, causing the first token of the tested sequence to be extracted from memory 301. As long as the test proceeds satisfactorily, counter 307 is advanced one at a time while counter 308 remains unchanged. When the test terminates successfully at the end of a sequence, counter 308 is advanced to the position of counter 307 and a new test is initiated. When the test terminates unsuccessfully (with an * entry to state 1), counter 308 is advanced by one and counter 307 is set equal to counter 308, again initiating a new test.

To implement the state diagram of acceptor 300, conventional techniques may be employed. For sake of completeness, however, FIG. 7 illustrates one embodiment for implementing the operative portion of the state diagram depicted in FIG. 5.

Since only five states are present in FIG. 5, FIG. 7 depicts five state-representing flip-flops (701-705). Each flip-flop is connected to an associated logic block (711-715), and logic blocks 711-715 are all responsive to signal bus 317 emanating from memory 301 (FIG. 6).

Each of the logic blocks 711-715 generates a different combinatorial output which is particularly designed to implement a portion of the state diagram. For example, logic block 711 develops the output signals necessary to move acceptor 300 out of state 1 and into states 2, 4 or A. Accordingly, block 711 has three outputs: a signal which directs entry to state A (lead 721), a signal directing entry into state 4 (lead 722) and a signal which directs entry into state 2 (lead 723). In accordance with FIG. 5, entry into state 4 is to occur only when $p=8$ occurs. Therefore, the boolean expression for the output on lead 722 is (state 1) ($p=8$). The first variable, (state 1), derives from flip-flop 701, and the second variable, $p=8$, derives from a decoding of the information on bus 317. Thus, a two input AND gate is used to generate the output signal of lead 722. The output signals of elements 711-715 are derived in an analogous manner.

As indicated previously, whenever an * exit is indicated by the state diagram of FIG. 5, acceptor 300 must re-enter state 1 and must particularly modify counters 307 and 308. For this purpose, OR gate 731 collects all the * exits and combines them to form an output signal on lead 732 which controls counter 307 and 308. The D exits also require a re-entry of state 1 but with a different modification of counters 307 and 308 (as described above). To this end, OR gate 733 is employed to generate an output signal on lead 734. The * and D output control signals are combined in OR gate 735 which controls entry into state 1.

Entry into any particular state must, of course, be accompanied by exit from all other states. Therefore, when any of flip-flops 701-705 is set, all other flip-flops must be reset. This is accomplished in FIG. 7 with the aid of logic blocks 741-745 and with OR gate 746. OR gate 746 develops a signal whenever any state transition occurs, and that signal is applied to the R inputs of logic blocks 741-745. Each one of logic blocks 741-745 is arranged to provide an output signal on the Q terminal when a signal is applied to the R input, and an output signal on the $\overline{Q}$ terminal when a signal is applied to both the R and S inputs. In this manner, blocks 741-745 combine with gate 746 to reset all flip-flops except for the flip-flop that is being set.

Control of the system of FIG. 4 is exercised by control element 200. It provides the sampling clock to A/D converter 220, the read and write control signals (leads 303 and 304) to memory 301, the set and advance commands (leads 310-314) to counters 306, 307 and 308, and all other control signals needed for the proper operation of feature extractor 230. Element 200 may be of conventional construction comprising an astable multivibrator for developing a basic clock signal, flip-flops interconnected to the multivibrator for developing sub-multiples of the basic clock signal and various gates interconnected to form the appropriate combinatorial logic for each required control signal. Being that the necessary circuitry is quite straightforward, the details of the logic gate interconnections are left to the choice of those who shall practice this invention.

It should be noted, of course, that although the vocal tract model of Coker has been employed in describing the principles of this invention, any other human vocal tract model may be employed as long as a good correlation is shown to exist between the position and movement of the articulatory parameters and the developed sounds.

E. H. Hafer 1

A PROGRAM USEFUL IN IMPLEMENTING PROCESSOR 280 (FIG. 4)

```
      FUNCTION FUNC (X)

REAL X(10)

C

C     MAIN ERROR FUNCTION

C

C  INPUTS:

C     X - PARAMETER VECTOR

C     POLE - REAL SPEECH FORMANTS   (COMMON /MATCH/)

C     ERR - ERROR DUE TO VIOLATIONS OF CONSTRAINTS

C                (COMMON /ERRORS/)

C

C  OUTPUTS:

C     FUNC - MEASURE OF FORMANT ERROR

C

COMMON /ERRORS/ ERR

COMMON /MATCH/ POLE(3)

C

REAL  AREAF(64), POLEF(3)

C

C

ERR = 0.0

FUNC = 0

C

C     COMPUTE CROSS SECTIONAL AREA FUNCTION
```

```
      CALL VOCAL (X(2), X(3), X(4), X(5), X(6), X(7), 0.01,
    &     AREAF, NSECF)
C
C     COMPUTE FORMANT FREQUENCIES
      CALL FORM (AREAF, NSECF, X(1),    POLEF)
C
      DO 10 I=1,3
      D = (POLEF(I) - POLE(I))/POLE(I)
   10 FUNC = FUNC + D*D
C
C     ADD ERROR DUE TO VIOLATION OF EXPLICIT AND
C               IMPLICIT CONSTRAINTS
      FUNC = FUNC + ERR
      RETURN
      END
      SUBROUTINE IVOCAL
C
C  INITIALLIZATION SUBROUTINE FOR VOCAL TRACT
C
      COMMON/VOCDAT/R1,R2SQ,ZBEND,ACOR,BCOR,RADSEC,RBEND,
    &  X,Y,ANAUT(40),SECT
C
      DATA  ARADSC /10.25/
C
C     COMPUTE LENGTH OF ONE VOCAL TRACT SECTION
C               (34 SEC IN 17 CM)
      SECT = 17.0/34.0
C
C     COMPUTE CONSTANTS TO SET VOCAL TRACT SHAPE
      R1 = 3.875
      R2SQ = 6.25
      ZBEND = 7.0
      ACOR = 3.81
      BCOR = 0.188
C
      RADSEC = SECT*ARADSC/R1/(14.5 - ZBEND)
      RBEND = (1.0 + ZBEND/SECT)*RADSEC
```

```
      RADSC1 = RADSEC*ACOR

RBEND1 = (1.0 + ZBEND/SECT)*RADSC1

N1 = 4.0/SECT

N2 = 19.0/SECT

DO 10 J=N1,N2

10 ANAUT(J) = BCOR*COS(FLOAT(J)*RADSC1 - RBEND1)
C

RETURN
      END

SUBROUTINE VOCAL (XI, YI, R, B, LL, WW, C,   A, I6)
C
C VOCAL TRACT SUBROUTINE
C
C INPUTS:
C    XI - TONGUE BODY HORIZONTAL COORDINATE
C    YI - TONGUE BODY VERTICAL COORDINATE
C    R  - TONGUE TIP RETROFLEX COORDINATE
C    B  - TONGUE TIP HEIGHT COORDINATE
C    LL - LIP EXTENSION COORDINATE
C    WW - LIP CLOSURE COORDINATE
C    C  - MINIMUM AREA OF A CROSS SECTION
C    SECT - LENGTH OF ONE VOCAL TRACT SECTION
C           (COMMON /VOCDAT/)
C
C OUTPUTS:
C    A  - CROSS SECTIONAL AREAS
C    I6 - NUMBER OF SECTIONS IN VOCAL TRACT
C    (X, Y) - TONGUE BODY POSITION  (COMMON /VOCDAT/)
C
C
      COMMON /ERRORS/ ERR
      COMMON/VOCDAT/R1,R2SQ,ZBEND,ACOR,BCOR,RADSEC,RBEND,
     &  X,Y,ANAUT(40),SECT
      REAL  L, LL, A(64)
      DATA  Z1, Z2B, G2B, Z2, G2, Z3, G3, Z4
     &      /2.0, 5.0, 1.5, 6.0, 2.0, 11.0, 0.31, 13.5/
      DATA  SC, AGP, ARADCR /3.0, 3.0, 10.25/
```

```
C
C
C      EXPLICIT CONSTRAINTS
       DXY = ABS (XI) - 1.5
       IF (DXY .GT. 0.0) ERR = ERR + DXY*DXY*100.0
       X = AMAX1 (-1.5, AMIN1 (1.5, XI))
C
       DXY = ABS (YI) - 1.5
       IF (DXY .GT. 0.0) ERR = ERR + DXY*DXY*100.0
       Y = AMAX1 (-1.5, AMIN1 (1.5, YI))
       W = WW
C
       AL=LL
       L=1.
       I1=1.5+Z1/SECT
       S2B=1.+(Z2B+G2B*Y)/SECT
       S2=1.5+(Z2+G2*Y)/SECT
       I2=S2
       I2A=MIN1(S2B,S2)
       S3=1.5+(Z3+.7*X+.3*Y)/SECT
       I3=S3
       I5=1.5+I5.5/SECT
C
       S5 = FLOAT(I5) - .01
       S4 = 1.5 + (Z4 + R + X - Y + .25*B)/SECT
       S4 = AMIN1 (S4, S5)
C
       I4=S4
       I6=I5+IFIX((L+1.)/SECT+.5)
C                * * * * * * * * * * * * * * * LIPS
       A5=1.125-.34*Y
       A6=(1.08-.89*W-.33*L)*A5 *L/AL
       MIN=I5+1
       DO 12 J=MIN,I6
    12 A(J)=A6
C                * * * * * * * * * * * * * * * TEETH
       MIN=I4+1
       IF(I5-MIN)30,22,22
```

```
   22 DO 24 J=MIN,I5
      S = (FLOAT(I5-J)*SECT)**2*5.
   24 A(J)=1.18*SQRT(S/(4.+S))+A5-ANAUT(J)
C              * * * * * * * * * * * * *  TONGUE BLADE
   30 S43=S4-S3
      A4=CIRC1(S4,Q4)
      S = ((FLOAT(I5) - S4)*SECT)**2*5.0
      A4P1 = 1.18*SQRT(S/(4.0 + S)) + A5 -
     &        (ANAUT(I4) + (ANAUT(MIN) - ANAUT(I4))*Q4)
      AT = A4 - (A4 + .250)*B*1.33
      AT = AMIN1 (AT, A4P1)
      A44=AT-A4
      MIN=I3+1
      DO 32 J=MIN,I4
   32 A(J)=CIRC(J)+A44*((FLOAT(J)-S3)/S43)**2
C              * * * * * * * * * * * * *  TONGUE BODY
      MI2=I2+1
      DO 42 J=MI2,I3
   42 A(J)=CIRC(J)
C              * * * * * * * * * * * * *  PHARYNX
      A2=CIRC1(S2,Q2)
      DO 52 J=I2A,I2
   52 A(J)=A2
      A20=A2/2.-.48-.25*Y
      A0=A2-A20
      PISEC=3.1416*SECT/4.
      DO 54 J=I1,I2A
   54 A(J)=A0+A20*COS(PISEC*(S2B-FLOAT(J)))
C              * * * * * * * * * * * * *  LARYNX
      A1=A(I1)/AGP
      MAX=I1-1
      DO 62 J=1,MAX
   62 A(J)=A1
C              * * * * * * * * * * * * *  CROSS SECTION
      CSQ=C**2
      AJERR = 0.0
C     IMPLICIT CONSTRAINTS TO DISALLOW NEGATIVE AREAS
      DO 100 J=1,I6
```

```
        IF (A(J) .LT. 0.0) AJERR = AJERR - A(J)
100 A(J) =SC*(SQRT(A(J)**2+CSQ)+A(J))
    ERR = ERR + AJERR*AJERR*SC*SC
C               * * * * * * * * * * * * * *  TONGUE TIP
    R4=1.-Q4
    AT=SC*(SQRT(AT**2+CSQ)+AT)
    A4=A(I4)
    A41=A(I4+1)
    A(I4+1)=A4*A41*AT/(A4*A41+R4*AT*(A4-A41))
    RETURN
    END

FUNCTION CIRC(J)
C   TONGUE BODY AREA FUNCTION
    COMMON /VOCDAT/R1,R2SQ,ZBEND,ACOR,BCOR,RADSEC,RBEND,
  &  X,Y,ANAUT(40),SECT
    ALPH=FLOAT(J)*RADSEC-RBEND
    CO =COS(ALPH)
    SI =SIN(ALPH)
    CIRC=R1+X*CO-Y*SI-SQRT(AMAX1(R2SQ-(X*SI+Y*CO)**2,0.))-
  &        ANAUT(J)
    RETURN
    END

FUNCTION CIRC1(S,Q)
C   CIRC LINEAR INTERPOLATION FUNCTION
    J=S
    Q=S-FLOAT(J)
    CIRC1=(1.-Q)*CIRC(J)+Q*CIRC(J+1)
    RETURN
    END

SUBROUTINE FORM (A, NSEC, ALENF,   F)
    DIMENSION  A(64), F(3)
C
C   WEBSTER HORN EQUATION ITERATION SUBROUTINE
C
```

```
C   INPUTS:
C       A - CROSS SECTIONAL AREAS
C       NSEC - NUMBER OF SECTIONS IN VOCAL TRACT
C       ALENF - VOCAL TRACT LENGTH FACTOR
C       SECT - LENGTH OF ONE VOCAL TRACT SECTION
C                   (COMMON /VOCDAT/)
C       (X, Y) - TONGUE BODY POSITION  (COMMON /VOCDAT/)
C
C   OUTPUTS:
C       F - FORMANT FREQ. IN HTZ.
C
C
        COMMON /ERRORS/ ERR
        COMMON/VOCDAT/R1,R2SQ,ZBEND,ACOR,BCOR,RADSEC,RBEND,
     &  X,Y,ANAUT(40),SECT
C
        DATA  C /33136.0/
C
C       F1 SEARCH REGION    --   500 HTZ +/- 400 HTZ
C       F2 SEARCH REGION    --  1500 HTZ +/- 800 HTZ
C       F3 SEARCH REGION    --  2500 HTZ +/- 800 HTZ
        REAL   FINC(7), FRSTF(3), AR(64), FREQ
        DATA   NFINC, FINC /7, 400., 200., 100., 50., 25.,
     &           12.5, 6.25/
        DATA   FRSTF /500., 1500., 2500./, AR /64*0./
C
        INTEGER  INCST(3)
        DATA   INCST /2, 1, 1/
C
C       EXCLUSIVE OR FUNCTION
        IEOR (A, B) = XOR (INT(SIGN(1.0,A)),INT(SIGN(1.0,B)))
C
C
C       COMPUTE CORRECTED VOCAL TRACT LENGTH FACTOR
        DXF = ALENF*(14.05 + 1.35*(Y - X))/17.0
C
        P1 = 0
        DX = SECT
```

```
              DXCSQ = (39.4784176 * DX * DX) / (C * C)
      C
      C     COMPUTE AREA RATIOS
              DO 10 I=2,NSEC
          10 AR(I) = A(I-1)/A(I)
      C
      C     LOOP FOR 1ST THREE RESONANCES

DO 100 NF=1,3
          DFREQ = 0.0
          FREQH = 0.0
          FREQL = 0.0
          FREQ = FRSTF(NF)
          IST = INCST(NF)
C
C     BINARY SEARCH LOOP
       15 DO 90 I=IST,NFINC
          FREQ = FREQ + DFREQ
          FDXCSQ = 1.0 - FREQ*FREQ*DXCSQ
          P0 = 1.0
          P1 = FDXCSQ
          NZX = 0
          DFREQ = 0.0
C
C     ITERATE WEBSTER HORN EQUATION THROUGH VOCAL TRACT
          DO 80 J=2,NSEC
          TP = AR(J)*(P1 - P0)
          P0 = P1
          P1 = FDXCSQ*P1 + TP
C
C     INCREMENT COUNTER IF WE HAVE PASSED A PRESSURE NODE
          IF (IEOR(P1,P0)) 20,80,80
       20 NZX = NZX + 1
          IF (NZX - NF) 80,30,30
              C  ************  END WEBSTER HORN EQUATION ITERATION LOOP
              C
              IF (DFREQ) 84, 86, 86
```

```
   84 P1H = P1
      FREQH = FREQ
      GO TO 90
C
   86 DFREQ = FINC(I)
      P1L = P1
      FREQL = FREQ
   90 CONTINUE
C ******************   END BINARY SEARCH LOOP
C
      IF (IST - NFINC) 91, 95, 98
   91 CONTINUE
      IF (FREQH) 93, 93, 92
   92 IF (FREQL) 93, 93, 94
   93 CONTINUE
C     IMPLICIT CONSTRAINTS ON FORMANT FREQUENCY
      ERR = ERR + P1*P1*100.0
      GO TO 99
C
C     LINEARLY INTERPOLATE NEW FREQ. AND REITERATE
   94 IST = NFINC
      FREQ = FREQL
      DF2 = FREQH - FREQL
      PH = P1H
      PL = P1L
      DFREQ = (DF2*PL)/(PL - PH)
      DF1 = DFREQ
      GO TO 15
C
C     PARABOLIC INTERPOLATION FOR FINAL FREQ. VALUE
   95 IST = IST + 1
      X3MX1 = PH - P1
      X2MX1 = PL - P1
      P1SQ = P1*P1
      DX2SQ = (PL*PL - P1SQ)
C
      ACOF = (X3MX1*DF1 - X2MX1*(DF1 - DF2))/
     &       (X2MX1*(PH*PH - P1SQ) - X3MX1*DX2SQ)
```

```
      BCOF = -DF1 - ACOF*DX2SQ

DFREQ = -ACOF*P1SQ - BCOF*P1/X2MX1

IF (ABS(DFREQ) .GT. DF2) GO TO 99

FREQ = FREQ + DFREQ
C
   98 CONTINUE

99 CONTINUE
      F(NF) = FREQ
  100 CONTINUE
C ******************    END RESONANCE FREQUENCY LOOP
C
      F(1) = 0.5*((F(1) + 100.0) +
     &         SQRT ((F(1) - 100.0)**2 + 4E4))/DXF

F(2) = F(2)/DXF

F(3) = (F(3) - 200.0)/DXF

RETURN

END

SUBROUTINE HCLIMB (X)

REAL  X(10), OG(10), OX(10), G(10)
C
C     FUNCTION MINIMIZATION SUBROUTINE
C
C     X - VECTOR
C     FUNC - FUNC TO BE MINIMIZED
C     LIM1 - ITERATION LIMIT     (COMMON /CLMDAT/)
C     EP - MINIMUM ACCEPTABLE ERROR    (COMMON /CLMDAT/)
C     DGI - INITIAL STEP SIZE    (COMMON /CLMDAT/)
C     ILB - LOWER BOUND OF X     (COMMON /CLMDAT/)
C     IUB - UPPER BOUND OF X     (COMMON /CLMDAT/)
C
C
      COMMON /CLMDAT/ LIM1, EP, DGI, ILB, IUB, IT1, IT2
C
C
C     INITIALIZE STEP, GRADIENT VECTOR, AND PREVIOUS
C              X VECTOR
      DGS = DGI

DO 10 I=1,10
```

```
              OX(I) = X(I) - DGS
       10 G(I) = 0.0
C
          IT1 = 0
C
C
     100 CONTINUE
          FX = FUNC(X)
C
C     QUIT IF MINIMUM FOUND
          IF (ABS(FX) .LT. EP) GO TO 500
C
C     QUIT IF STEP TO SMALL  (WE ARE CREEPING)
          IF (ABS(DGS) .LT. 1E-4) IT1 = IT1 + 2000
C
C     INCREMENT AND QUIT IF ITERATION LIMIT EXCEEDED
          IT1 = IT1 + 1
          IF (IT1 - LIM1) 250, 250, 500
C
C     COMPUTE GRADIENT
     250 GMAG = 0
C
          DO 290 I=ILB,IUB
          OG(I) = G(I)
          SXI = X(I)
          DG = (X(I) - OX(I))/16.0
          IF (ABS(DG) .LT. 1E-5) DG = 1E-5
C
          X(I) = SXI + DG
          FXP = FUNC (X)
          DFX = FX - FXP
C
     280 G(I) = DFX/DG
          GMAG = GMAG + G(I)*G(I)
     285 X(I) = SXI
          OX(I) = SXI
     290 CONTINUE
C
```

```
C      QUIT IF MAGNITUDE OF GRADIENT IS ZERO
       IF (GMAG) 295, 295, 300
   295 IT1 = IT1 + 1000
       GO TO 500
C
C      NORMALIZE AND MODIFY GRADIENT
   300 GMAG = SQRT (GMAG)
       DO 310 I=ILB,IUB
   310 G(I) = 0.8*G(I)/GMAG + 0.2*OG(I)
C
C      STEP IN DIRECTION OF MODIFIED GRADIENT
       IT2 = 0
       DG = DGS/4.0
       DGS = 0
       FXP = FX
C
       DO 320 I=ILB,IUB
       X(I) = X(I) + G(I)*DG
   320 CONTINUE
C
C
   400 IT2 = IT2 + 1
       DG3 = DG2
       DG2 = DGS
       DGS = DGS + DG
       FX3 = FX2
       FX2 = FXP
       FXP = FUNC(X)
C
C      DID FUNCTION INCREASE OR DECREASE?
       DFX = FX - FXP
       IF (DFX) 440, 420, 420
C
C      FUNCTION HAS DECREASED.  DOUBLE STEP SIZE
   420 DG = DG + DG
       FX = FXP
       GO TO 450
```

```
C
C      FUNCTION HAS INCREASED.  BACKUP IF 1ST POINT.
C                INTERPOLATE IF NOT
   440 IF (IT2 - 2) 445, 480, 480
   445 DG = (-DG*5.0)/4.0
C
C      TAKE A STEP
   450 DO 460 I=ILB,IUB
   460 X(I) = G(I)*DG + X(I)
       GO TO 400
C
C  PARABOLIC INTERPOLATION
   480 X3MX1 = DG3 - DGS
       X2MX1 = DG2 - DGS
       Y2MY1 = FX2 - FXP
       X1SQ = DGS*DGS
       X2M1SQ = DG2*DG2 - X1SQ
C
       ACOF = (X2MX1*(FX3 - FXP) - X3MX1*Y2MY1)/
     &        (X2MX1*(DG3*DG3 - X1SQ) - X3MX1*X2M1SQ)
       BCOF = (Y2MY1 - ACOF*X2M1SQ)/X2MX1
       PDG = BCOF/(2*ACOF) + DGS
       DO 485 I=ILB,IUB
   485 X(I) = X(I) - G(I)*PDG
       DGS = DGS - PDG
       GO TO 100
C
C
   500 CONTINUE
       RETURN
       END
```

What is claimed is:

1. A speech recognition system responsive to sampled representations of applied speech comprising:

an extended feature extractor, responsive to said sampled representations, for determining features of speech contained in said sampled representations, including a feature corresponding to the tongue body position and its direction of movement; and an acceptor, responsive to said feature extractor, for matching the sequence of said determined features to predetermined sequences of features corresponding to selected words.

2. The system of claim 1 wherein the said features determined by said feature extractor comprise a Silence token, a Burst token, a Fricative token, and a Tongue body trajectory token.

3. The system of claim 1 wherein said feature extractor comprises:

first means responsive to said sampled representation for computing Silence features;

second means responsive to said sampled representations for computing Burst features;

third means responsive to said sampled representations for computing Fricative features;

fourth means responsive to said sampled representations for computing formant frequencies of said applied speech; and fifth means responsive to said fourth means for converting said format frequencies to Tongue body trajectory features.

4. The apparatus of claim 3 wherein said fifth means employs a vocal tract model to convert said formant frequencies to said Tongue body trajectory features.

5. The apparatus of claim 3 wherein said fifth means comprises a memory look-up table.

6. A speech recognition system having means for developing a sequence of features representing applied signals and having means for matching the succession of features to predetermined sequences of features representative of preselected words characterized in that said means for developing a sequence of preselected features determines the formants contained in said applied signals and converts said formants to Tongue body trajectory features.

7. The system of claim 6 wherein said means for extracting converts said formants to said Tongue body trajectory features in accordance with Coker's vocal tract model.

8. A method of recognizing speech by converting representations of intervals of said speech into sequences of preselected types of parameters including the steps of (1) identifying the formant frequency content of said speech during vowel intervals;

(2) transforming said formant frequency content into tongue body position and direction of movement parameters; and (3) detecting a correspondence between said sequences of preselected types of parameters including said tongue body parameters with a preselected sequence of said preselected types of parameters.

9. A method for recognizing connected speech comprising the steps of analyzing an applied speech signal in search for silence intervals and developing a silence token whenever such intervals are present;

analyzing said speech signal in search for burst intervals and developing a burst token whenever such intervals are present;

analyzing said speech signal in search for fricative sound vowels and developing a fricative token whenever such intervals are present;

analyzing said speech signal in search for vowel sound intervals and developing a tongue body trajectory token whenever such intervals are present; and comparing the succession of developed tokens to preselected sequences of tokens characteristic of prechosen words to be detected.

10. The method of claim 9 wherein said step for developing tongue body trajectory tokens comprises the steps of:

analyzing said speech signal to develop the formant frequency contained therein; and correlating said developed formants to tongue body positions.

11. A method for recognizing speech uttered by a speaker by extracting from said speech a sequence of tokens representative of said speech, said tokens including a class of tokens characterizing said speaker's tongue body trajectory, comprising the steps of:

deriving the values of the formant frequencies contained with said speech; and converting said derived formants to tongue body positions in accordance with a vocal tract model.

* * * * *